United States Patent [19]

Uramoto

[11] Patent Number: 4,590,485

[45] Date of Patent: May 20, 1986

[54] THERMAL RECORDER

[75] Inventor: Yuji Uramoto, Matsudo, Japan

[73] Assignee: Canon Kabushiki Kaisha, Tokyo, Japan

[21] Appl. No.: 633,294

[22] Filed: Jul. 23, 1984

[30] Foreign Application Priority Data

Jul. 29, 1983 [JP] Japan ................................ 58-139224

[51] Int. Cl.[4] ........................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS 4,407,003 9/1983 Fukui ............................ 346/76 PH 4,442,342 4/1984 Yoneda .............................. 219/216

4,486,759 12/1984 Toyomura ...................... 346/76 PH

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A recorder includes a thermal head for recording images on a recording medium based on the recording signal to be provided, a power supply switching unit for supplying power for operating the thermal head, a voltage detector for detecting power supplied by the power supply switching unit, and a printer control unit which actuates the voltage detector for a plurality of times, determines the power value of the recording signal to be supplied to the thermal head based on selecting a higher level from the results of the plurality of detections, and controls recording by the thermal head according to the selected level.

11 Claims, 6 Drawing Figures

| RANK | VOLTAGE | HEAT PULSE WIDTH t(X) |
|---|---|---|
| A | V(A)~V(B) | t (A) |
| B | V(B)~V(C) | t (B) |
| C | V(C)~V(D) | t (C) |
| D | V(D)~V(E) | t (D) |
| E | V(E)~V(F) | t (E) |
| F | V(F)~ | t (F) |

THERMAL RECORDER

BACKGROUND OF THE INVENTION

1. Field of the Invention

The present invention relates to recorders for recording characters, graphs, and the like on a recording medium.

2. Description of the Prior Art

Recorders on the market have a thermal head carrying one or more dot-like heating elements. The head is caused to run in contact with a sheet of heat sensitive recording paper or in contact with a sheet of ordinary recording paper via an ink ribbon coated with ink which is dissolved by heat, and patterns of desired characters, or the like, are formed and printed on the recording paper by supplying electric pulses (heat pulses) of a predetermined width to each heating element at proper times.

As a power supply for supplying pulses to the thermal head of such thermal printer, a dry battery or 100 V AC power source, DC-converted by an adaptor is typically used.

The voltage of the AC power source frequently varies (FIG. 1 shows an example of AC adaptor power supply voltage variation). Accordingly, if the heat pulse width is fixed, variations would occur in the density of printing according to the level variation of the pulses fed to the thermal head. In some cases, the head may be damaged due to application of an excessively large voltage. Accordingly, it is necessary to control the width of the heat pulse to a proper value corresponding to the supply voltage variation. As a pulse width control means, it has been proposed to make a head travelling pulse motor a dummy load, twice energization of that load being first performed each time of head travel in one direction (that is, a single line printing), and the pulse width being determined based on the average value of detected supply voltages, so that a predetermined calorific value is generated at the head.

This method, however, has a drawback in that when, for example, troughs of supply voltages have been detected, voltages lower than the actual voltages are detected with the resultant possibility of head damage.

In addition, according to this method, there is no way of dealing with supply voltage variation that occurs during line printing. Such supply voltage variation occurs typically when the AC adaptor is inserted unexpectedly while the head is driven by a dry battery. In such case, since the supply voltage rises abruptly, when heat pulses of the same width as before are supplied over a predetermined duration of time, the thermal head would be damaged. To prevent abrupt supply voltage variation, it has been proposed that when two power sources namely a dry battery and an AC adaptor, are used typically in a desk top computer with a thermal printer, these power sources are switched by a slide switch. However, since addition of a mechanical part such as a slide switch increases the size of the equipment, and also becomes cost, this approach is not preferred.

The aforementioned facts apply to a variety of printers as well as the thermal printer.

SUMMARY OF THE INVENTION

An object of the present invention is to provide a recorder capable of maintaining a constant recording density regardless of supply power variation.

A further object of the present invention is to prevent the recording head from being damaged by abrupt power changes caused typically by power source switching.

A further object of the present invention is to perform accurate supply power detection.

The above and further objects of the present invention will be better understood from the following description.

DETAILED DESCRIPTION OF THE PREFERRED EMBODIMENTS

Preferred embodiments of the present invention will now be described with reference to the accompanying drawings.

Figure 1:
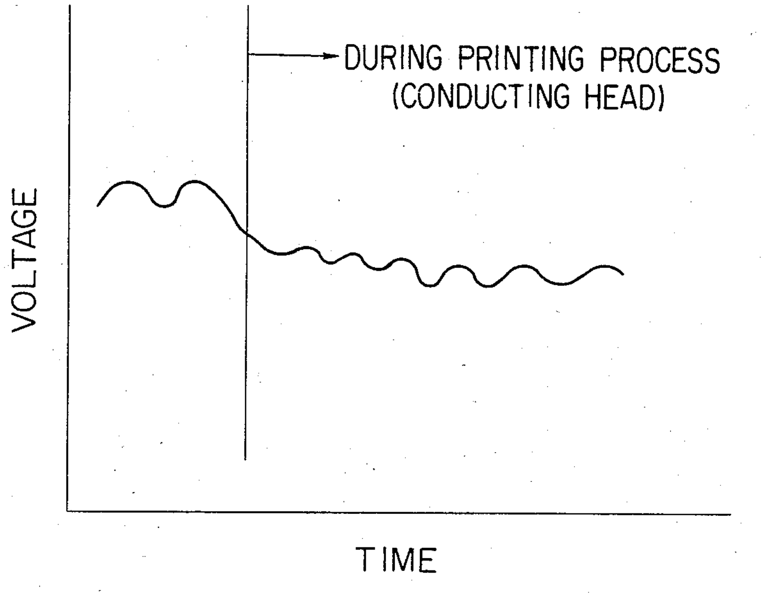
FIG. 1 is a graph showing supply voltage variation.
Figure 2:
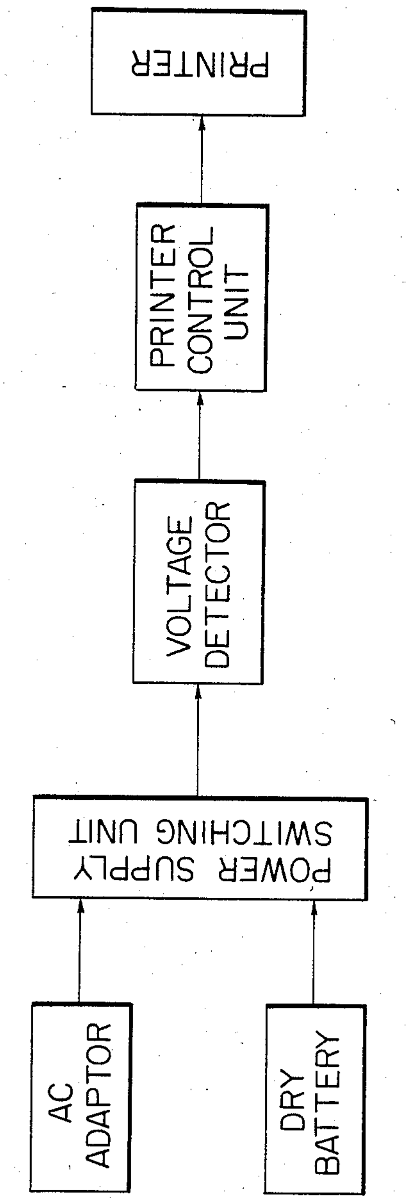
FIG. 2 is a block diagram of an embodiment of the present invention.
Figures 3, 4:
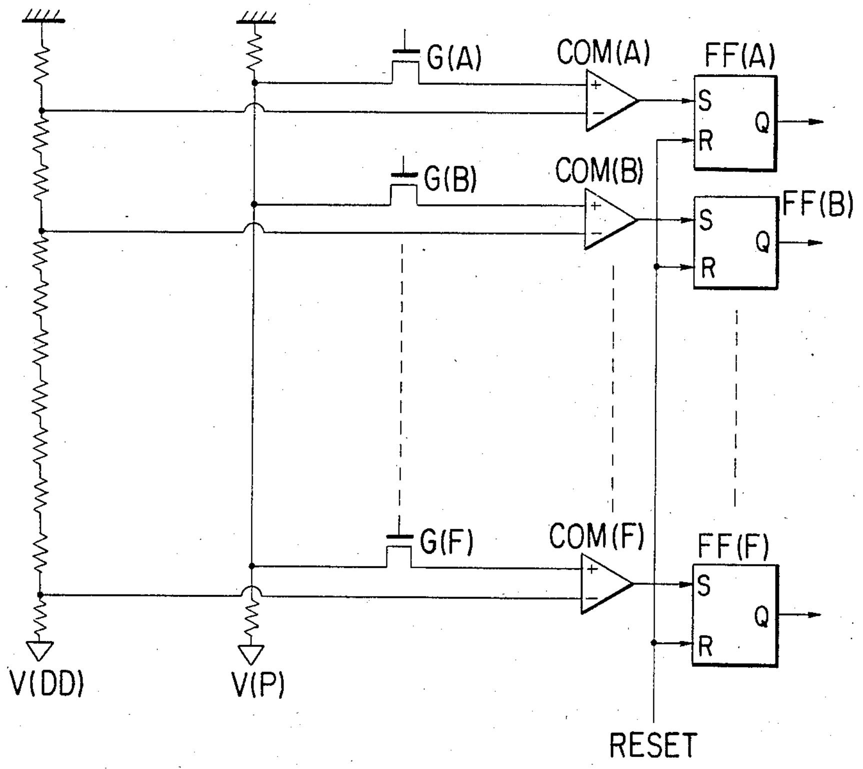
FIG. 3 is a table showing ranks of detected voltages.
FIG. 4 is a circuit diagram of the voltage detector.

FIG. 2 is a block diagram showing an embodiment of the present invention. At a power supply switching unit, automatic switching is performed so that only the supply voltage from an AC adaptor is supplied when the AC adaptor is inserted, and only the supply voltage from a dry battery is supplied when the AC adaptor is not inserted. The voltage detector detects the voltage from the power supply switching unit, and assigns a rank A–F as shown in FIG. 3. A printer control unit creates an optimum heat pulse width t(A) through t(F) corresponding to each rank of supply voltage as shown in FIG. 3.

FIG. 4 is a circuit diagram showing an embodiment of the voltage detector in detail. In FIG. 4, V(P) is a supply voltage to be supplied from the power supply switching unit. The voltage component left after subtraction of a saturation voltage of a driving transistor (not shown) from V(P) is the voltage of the recording signal to be directly applied to the thermal head. V(DD) is a stabilized voltage created by a regulator from the supply voltage, and is a reference voltage for the voltage detection.

G(A) through G(F) are gates for controlling the voltage comparison, COM(A) through COM(F) are comparators for comparing the voltage value resistance-divided from V(DD) (of V(A) through V(F) in FIG. 3 and a voltage divided from supply voltage V(P), and FF(A) through FF(F) are flip-flops (memory circuits) for storing voltage comparison information obtained at COM(A) through COM(F), respectively.

COM(A) sets FF(A) by sending a signal when the voltage divided from V(P) is larger than the voltage V(A) resistance-divided from V(DD), COM(B) sets FF(B) by sending a signal when the voltage from V(P) is larger than the voltage V(B) from V(DD), and similarly FF(C) through FF(F) are set when the voltage from V(P) is larger than the voltages from V(C)

through V(F) as a result of comprison at COM(C) through COM(F), respectively.

Figure 5:
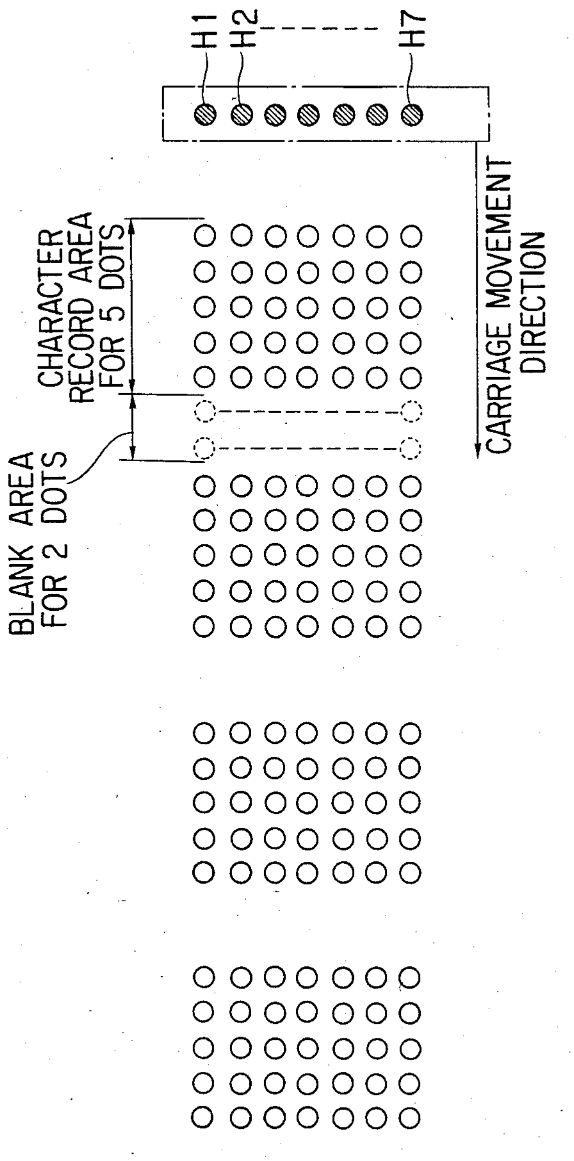
FIG. 5 shows the printing system of the thermal printer.

FIG. 5 shows a typical recording system of the thermal printer. For recording, a carriage is moved in the arrow direction by a pulse motor. A thermal head (recording means) carrying seven heating elements H1–H7 arranged orthogonal to the moving direction is held in position on the carriage. When the carriage is moving, the thermal head is constantly in contact with the heat sensitive recording paper (recording medium) which is securely held. Normally for recording characters, an area of 7 dots (vertical)×5 dots (horizontal) with respect to the heat sensitive recording paper is used for a character, and a 2-dot area in the lateral direction following the character recording area is used as a blank area. When the thermal head arrives at the recording area as the carriage moves, a recording signal, i.e., a heat pulse, is fed to each heating element at a position according to the character to be formed.

Figure 6:
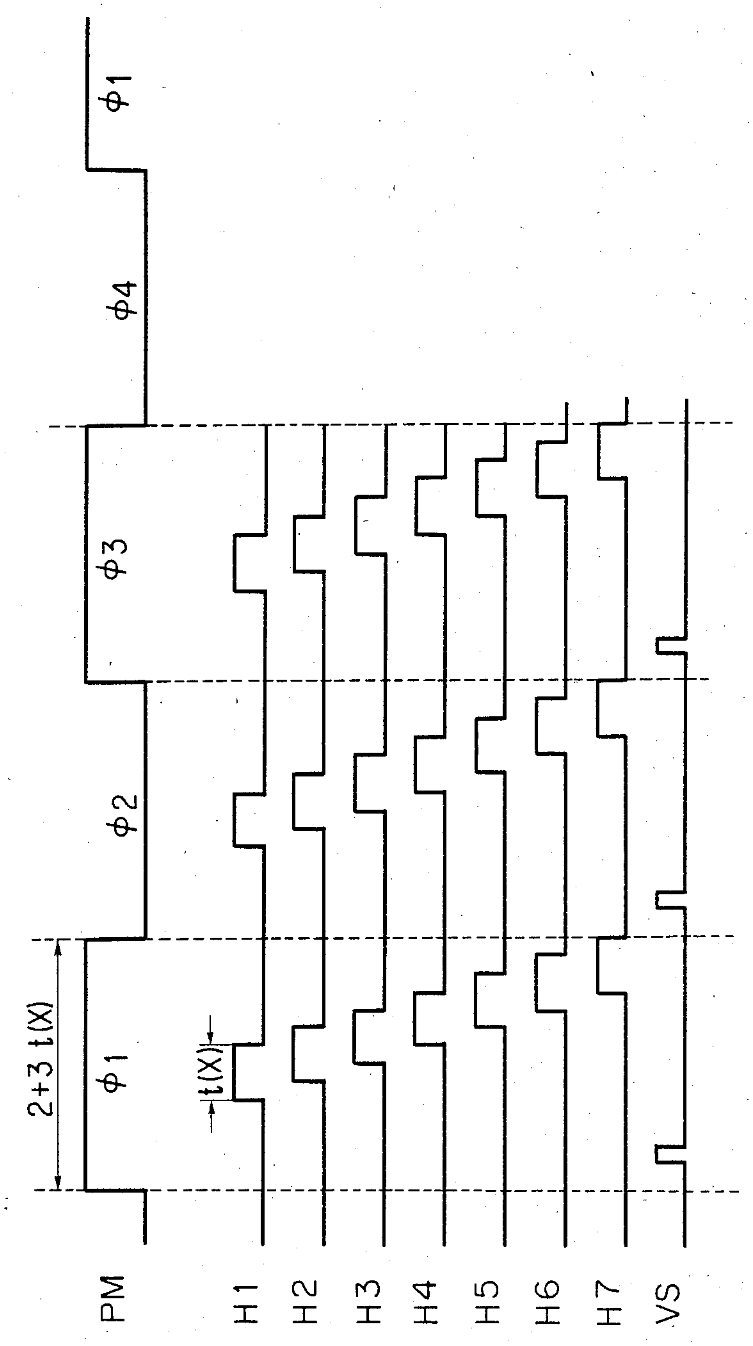
FIG. 6 is a thermal head drive timing chart.

FIG. 6 is a timing chart showing an example of thermal head driving. PM represents the phase change of the pulse motor. For a single phase of PM, a heat pulse of the width t(x) corresponding to the dots of a column in the recording area are fed to H1 through H7. All heating elements stop being energized for 2 msec after a pulse motor phase change to provide heating rest time to the thermal head for preventing deterioration and burn-out of the thermal head due to heat accumulation. The heating times of individual heating elements are varied by ($\frac{1}{3}$)t(x) because when all heating elements are energized at a time, the supply voltage drops to a large extent typically due to internal resistance of battery, and proper recording cannot be made. Simultaneous energization is limited to 3 dots at the maximum. VS is a power voltage detection signal, and is sent out once in the 2 msec heating rest time. By this signal the gates in group G(A) through G(F) of the voltage detector shown in FIG. 4 are opened sequentially, and within the heating rest time supply voltage information is stored in the flip-flop group FF(A) through FF(F). In the VS signal sending mode, i.e., in the voltage detection mode, the pulse motor is always in the 2-phase exciting state, thus preventing abrupt voltage variation.

Supply voltage detection is performed 7 times before continuous 7 phases of PM corresponding to horizontal 5 dots and the following 2 dots for recording a single character, and then flip-flops of the voltage detector are sequentially detected from FF(F) to FF(A), and the point where the set flip-flop is detected becomes the detected voltage rank. For example, when FF(E) through FF(A) are set and FF(F) alone is not set, since a flip-flop setting is detected only at FF(E), the detected voltage rank is determined as E. Based thereon, the basic pulse of the width t(E) is generated, and then all flip-flops are reset by a RESET signal. The basic pulse thus obtained is fed to the thermal head when the following character is recorded. When the recording is performed, detection of supply voltage is performed in the same manner at the same time, and the basic pulse is generated. The operation is repeated. For the first character when power is switched on, supply voltage is detected by the voltage detector of FIG. 4 at the rise time of the phase of the pulse motor, and recording is performed based thereon.

As described above, since in this embodiment each time one character is recorded the supply voltage is detected, even when the AC adaptor is inserted unexpectedly during the recording process, a heat pulse of a large calorific value is applied to the thermal head for only one character at most, and thereafter a proper heat pulse is applied. Accordingly, there is no possibility of heating element burn-out, and deterioration of recording quality can be kept to a minimum.

In addition, in this embodiment, for the voltage detection of each character the voltage detection is performed 7 times, and the detected voltage of the highest rank is taken as the detection result. This provides the following effects. Compared with the dry battery power supply the AC adaptor power supply is characterized by a long voltage recovery time. Accordingly, typically when the heating elements for 3 dots are driven at the same time in the recording of the previous digit, supply voltage drops to a large extent and is not recovered sufficiently. Therefore, when only the voltage at that time is detected, the supply voltage when the heating elements are driven actually becomes higher than the detected voltage. In addition, the detected voltage is rendered meaningless by the voltage variation of the AC adaptor. In order to solve such problems, ripple effects have been eliminated by performing detection of supply voltage 7 times, and yet the detected voltage of the highest rank is used as the detection result. In this manner, even when the supply voltage of the AC adaptor falls and recovery is delayed a, more proper heat pulse can be applied to the heating element.

In the case of battery power supply, voltage recovery is swift, and there is no voltage variation such as in the case of AC adaptor power supply. Nevertheless, a proper heat pulse can be applied as in the case of the AC adaptor. As described above, this embodiment acts effectively both on the AC adaptor power supply and battery power supply.

Although the present invention has been described in connection with the particular embodiments shown and discussed hereinabove, it is to be expressly understood that many other alterations and modifications may be made without departing from the spirit and the scope of the present invention. For example, though the voltage rank is set to 6 levels in the embodiment, it may be set to any number of steps. In addition, the number of the heating elements is not limited to 7, but any suitable number of heating elements may be used. The arrangement is not limited to a single line, but it may be made to a plurality of lines. In addition, it is apparent that the number of dots for a single character is not limited to 5×7 dots, and the blank area is not limited to 2 dots. In addition, the relationship between the heat pulse supply timing to each heating element and the PM phase is not limited to a single phase of PM being [2+3t(x)], but it may be otherwise set.

In addition, instead of used the detected voltage of the highest rank as a detection result, the second or the third highest detection voltage may be used. In addition, though supply voltage is detected for each character in this embodiment, it may be detected for each dot (1, 2, 3 . . . ). In addition, the present invention is applicable not only to a heat sensitive type but to a heat transfer type recorder.

In addition, the present invention is applicable to a variety of printers, such as a bubble jet type ink jet printer and a wire dot printer. In addition, although in the above embodiment, the voltage of the power supply is detected, such alternatives as detecting current and detecting capacitor charge-up time may be used, with the eventual result being the detection of the power of the power supply. In addition, although in the above embodiment, the pulse width of recording signal is changed according to the voltage detection result, the voltage value of the recording signal may be changed instead.

According to the embodiment described hereinabove, supply voltage detection is performed a plurality of times within a predetermined range, and the optimum heat pulse corresponding to the higher level voltage of detected voltages is directly used for the recording in the next predetermined range. Accordingly, supply voltage variation can be dealt with very favorably, the thermal head is kept free of the heat damage, and recording density can be kept constant. In addition, according to the above embodiment, regardless of whether the power source is a dry battery or an AC adaptor, voltage variation can be dealt with effectively. In addition, for unexpected power source switching (dry battery to AC adaptor), no particular slide switch is required, and proper recording can be performed.

What I claim is:

1. A recorder comprising:

recording means for intermittently recording on a recording medium in recording intervals having a predetermined interval for recording and a specific rest interval;

power supply means for supplying power to actuate said recording means;

detection means for detecting the power that can be supplied by said power supply means; and control means for actuating said detection means in a rest interval, determining the power value of a recording signal to be applied to said recording means based on the result of the detection by said detection means, and controlling said recording means.

2. The recorder of claim 1, wherein said control means actuates said detection means a plurality of times in a rest interval and determines the power value of the recording signal to be applied to said recording means based on a higher level result of the plurality of detections.

3. The recorder of claim 2, wherein said control means has a conversion table for determining the power of the recording signal according to the higher level result.

4. The recorder of claim 2, wherein said detection means includes a comparator for comparing the voltage of said power supply means and a reference voltage and a memory circuit for storing the output of said comparator and clearing the memory after a plurality of voltage comparisons.

5. The recorder of claim 2, wherein said control means actuates said detection means in each rest interval.

6. A recorder comprising:

recording means for recording on a recording medium having recording and non-recording areas on a line thereof, recording signals being applied to said recording means in the recording areas while said recording means is sequentially moving along a line of the recording medium over the recording and non-recording areas;

power supply means for supplying power to actuate said recording means;

detection means for detecting the power that can be supplied by said power supply means; and control means for actuating said detection means while said recording means is moving over a non-recording area, determining the power value of the recording signal to be applied to said recording means based on the result of the detection by said detection means, and controlling said recording means.

7. The recorder of claim 6, wherein said control means actuates said detection means a plurality of times in a single non-recording area and determines the power value of the recording signal to be applied to said recording means based on a higher level result of the plurality of detections.

8. The recorder of claim 6, wherein said recording means is moved by a motor and said motor is driven by power supplied from said power supply means.

9. A recorder comprising:

recording means for recording on a recording medium in a dot pattern upon application of a recording signal;

a pulse motor for moving said recording means over the recording medium in response to a driving signal;

power supply means for supplying power to actuate said recording means;

detection means for detecting the power that can be supplied by said power supply means; and control means for actuating said detection means according to the changing of the energizing phase of the driving signal for said pulse motor, determining the power value of the recording signal to be applied to said recording means based on the result of the detection by said detection means, and controlling said recording means.

10. The recorder of claim 9, wherein said control means actuates said detection means a plurality of times in a blank area of a character printing area which follows immediately after recording a character and determines the power value of the recording signal based on the detection result at a higher position than the results of the other detections.

11. The recorder of claim 10, wherein said control means determines the power value of the recording signal by providing for detection of the power value of said power supply means in the blank area in each character printing area.

* * * * *